United States Patent
Fensel et al.

(10) Patent No.: US 6,524,980 B1
(45) Date of Patent: Feb. 25, 2003

(54) ROOFING MEMBRANES USING COMPOSITE REINFORCEMENT CONSTRUCTIONS

(75) Inventors: Fred A. Fensel, Shaker Heights, OH (US); Louis Kevin Horne, Smiths, AL (US); Derrel M. Winowich, Jr., Phenix City, AL (US); Colin J. Hallam, Phenix City, AL (US); David Sokol, Olmsted Falls, OH (US)

(73) Assignee: The Garland Company, Inc., Cleveland, OH (US)

( * ) Notice: Subject to any disclaimer, the term of this patent is extended or adjusted under 35 U.S.C. 154(b) by 0 days.

(21) Appl. No.: 09/410,518

(22) Filed: Oct. 1, 1999

(51) Int. Cl.[7] ............... D03D 25/00; B32B 5/26; B32B 5/12

(52) U.S. Cl. .............. 442/181; 442/282; 442/269; 428/110; 428/113

(58) Field of Search .............. 442/269, 282, 442/381; 428/109, 110, 113

(56) References Cited

U.S. PATENT DOCUMENTS

| | | |
|---|---|---|
| 3,728,195 A | 4/1973 | Bolles |
| 4,450,196 A | 5/1984 | Kamat |
| 4,472,086 A * | 9/1984 | Leach ............ 405/258 |
| 4,491,617 A | 1/1985 | O'Connor et al. |
| 4,511,619 A | 4/1985 | Kuhnel |
| 4,539,254 A | 9/1985 | O'Connor et al. |
| 4,615,934 A | 10/1986 | Ellison |
| 4,762,744 A | 8/1988 | Woiceshyn et al. |
| 4,780,350 A | 10/1988 | O'Connor et al. |
| 5,108,831 A | 4/1992 | Green |
| 5,151,146 A | 9/1992 | Green |
| 5,194,320 A | 3/1993 | Groshens |
| 5,251,415 A | 10/1993 | Van Auken et al. |
| 5,296,278 A | 3/1994 | Nishimura |
| 5,314,556 A | 5/1994 | Woiceshyn |
| 5,370,756 A | 12/1994 | Buis et al. |
| 5,439,726 A | 8/1995 | Woiceshyn |
| 5,474,838 A | 12/1995 | Callaway et al. |
| 5,525,413 A | 6/1996 | Daurer et al. |
| 5,540,971 A | 7/1996 | Daurer et al. |
| 5,569,430 A | 10/1996 | Callaway et al. |
| 5,593,766 A | 1/1997 | Woiceshyn |
| 5,695,373 A | 12/1997 | Blackmore |
| 5,766,724 A | 6/1998 | Tailor |
| 6,171,984 B1 * | 1/2001 | Paulson ............ 442/331 |
| 6,296,921 B1 | 10/2001 | Blackmore |
| 2001/0003081 A1 | 6/2001 | Callaway |
| 2001/0051483 A1 | 12/2001 | Callaway |

* cited by examiner

Primary Examiner—Terrel Morris
Assistant Examiner—Alexis Wachtel
(74) Attorney, Agent, or Firm—Fay, Sharpe, Fagan, Minnich & McKee

(57) ABSTRACT

A composite substrate (10) is prepared for reinforcing a bituminous roofing material by securing together a carrier web (12) with a first set (14) of fiberglass rovings bundles and a second set (16) of fiberglass rovings bundles. The carrier web will have a pair of opposed planar surfaces. The web will define a machine direction and a cross machine direction for the substrate, with the first and second sets of rovings bundles each positioned in parallel relationship, with the longitudinal axes defined by the individual rovings of the two sets being in non-parallel relationship to each other when viewed normal to the plane of the web. The bundle sets are maintained in the spaced apart parallel relationships and the non-parallel angular relationship by the adhesive, stitching or other conventional method of securing which holds the substrate together. If a stitching machine is used, the preferred yarn (18) would be a polyester yarn. The preferred web is a woven polyester mat and the preferred rovings bundles will be 1800 yield or heavier. After preparation, this substrate is dipped in molten bituminous material to provide a web of reinforced roofing material in which the substrate is embedded in a continuous matrix of the bitumen.

29 Claims, 1 Drawing Sheet

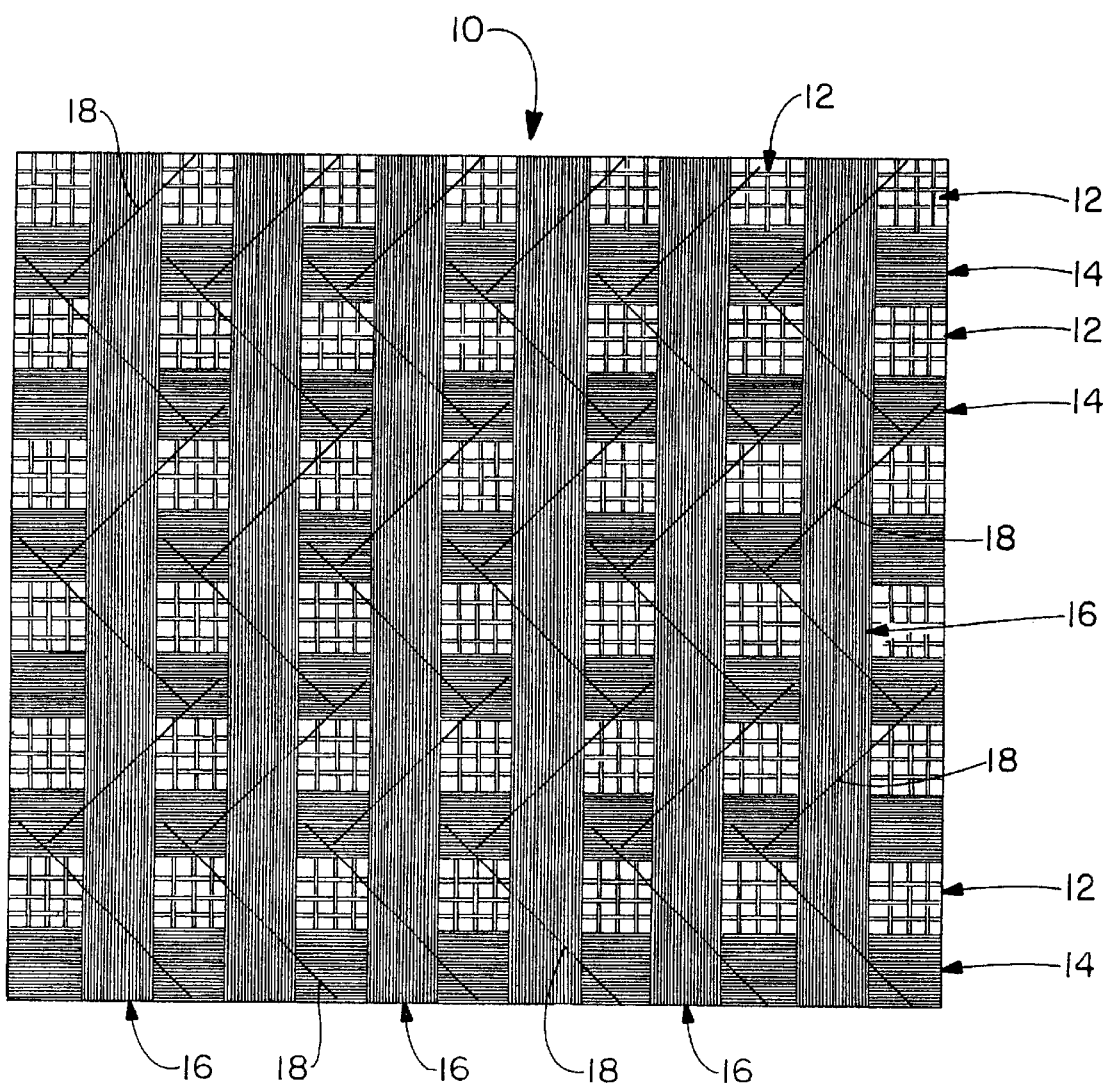

ROOFING MEMBRANES USING COMPOSITE REINFORCEMENT CONSTRUCTIONS

The present invention relates to roofing membranes exhibiting high strength and performance through the incorporation of novel composite reinforcements. Particular applications are found in association with bituminous roofing membranes including these reinforcements.

BACKGROUND OF THE ART

Bituminous roofing membranes are conventionally built upon a substrate to provide strength to the bituminous materials. Prior art substrates with a composite nature have included multiple layers of pre-manufactured reinforcements such as woven scrims, non-woven scrims, mats, and veils. A preferred material in many of these reinforcements is fiberglass yarn. The composite nature of these prior art reinforcing substrates has been achieved by joining layers thereof with adhesives, sewing the layers together or knitting the layers together. The composite reinforcement substrate is then saturated and coated with the bituminous material so that a substantially continuous matrix of the bitumen surrounds and encloses the substrate.

Some examples of prior art teachings of the use of adhesives to combine multiple layers of reinforcement materials, followed by conversion into roofing products are provided by these United States patents: U.S. Pat. No. 4,491,617; U.S. Pat. No. 4,539,254; U.S. Pat. No. 4,762,744; U.S. Pat. No. 4,780,350; and U.S. Pat. No. 5,108,831. Similarly, the concept of sewing or knitting the reinforcement materials, followed by conversion into roofing products are provided by U.S. Pat. Nos. 5,474,838 and 5,569,430.

Fiberglass yarns, especially high performance fiberglass yarns, have been the material of choice for forming reinforcement materials for this application. For example, a non-woven fiberglass yarn scrim is described in U.S. Pat. No. 3,728,195. Other teachings use fiberglass yarn in woven scrims, which consist of the yarn in a typical leno weave construction. A leno weave differs from a plain weave (in which the warp and filling yarns cross alternately) in that it is a locking-type weave in which two or more warp yarns cross over each other and interlace with one or more filling yarns. The leno weave primarily prevents the shifting of the yarns in an open fabric. While structurally effective, the cost of a high strength high performance fiberglass yarn for forming a composite reinforcement can be prohibitively high. Fiberglass yarns, as the name indicates, are not monofilamentous strands of fiberglass. Instead, a single fiberglass yarn comprises multiple individual strands or filaments of fiberglass, which have been processed into the yarn configuration by steps such as twisting, chemical finishing, etc. While not a staple material, the processing steps involved in creating the yarn create a material with different properties than those exhibited by a monofilamentous product. When sold commercially, fiberglass yarns are typically graded in terms of "yield", which is a unit of measure indicating the number of lineal yards of the fiber provided by a pound of glass. In this manner, "yield" is effectively inversely proportional to the term "denier" as used in association with fibers such as NYLON, since denier indicates the weight of the material required to provide a given lineal length (9000 m) of the fiber. Roofing scrims have conventionally been provided using fiberglass yarns of 1800, 3700 and 7500 yields, the higher yield number defining a lighter yarn.

It is, therefore, an advantage of the present invention to provide a composite reinforcement having strength and performance comparable to fiberglass yarn, but which has a much lower cost.

SUMMARY OF THE INVENTION

This and other advantages of the present invention are provided by a composite reinforcement substrate for a bituminous roofing material, comprising a carrier web and first and second sets of rovings bundles. The carrier web has a pair of opposed planar surfaces and it defines both a machine direction and a cross machine direction for the substrate to be created. The first set of rovings bundles comprises individual rovings with longitudinal axes positioned in spaced apart parallel relationship atop one of the planar surfaces of the carrier web and the second set of rovings bundles comprising individual rovings with longitudinal axes positioned in spaced apart parallel relationship to each other, but in an angular non-parallel relationship to the longitudinal axes of the first set of rovings bundles. The second set of rovings bundles will either rest directly on one of the planar surfaces of the carrier web or on the first set of rovings bundles. The first and second sets of rovings bundles and the carrier web are secured together in a fashion which maintains each set of bundles in the spaced apart parallel relationships and maintains the two sets in the angular non-parallel relationship.

The sets of rovings bundles may be secured to the carrier web and to each other with a conventional adhesive, with a stitch bonded yarn, or by other conventional means. If stitch bonding is used, the preferred yarn would be polyester yarn.

In one embodiment, the first set of rovings bundles is positioned parallel to the cross machine direction of the carrier web and the second set of rovings bundles is positioned parallel to the machine direction of the carrier web.

In one embodiment, the carrier web is formed from a polyester and has a weight in the range from about 0.5 to about 2.0 ounces per square yard.

In one embodiment, the first and second set of rovings bundles will comprise individual fiberglass rovings of 1800 yield or heavier, and even more preferably, of 600 yield or heavier.

BRIEF DESCRIPTION OF THE DRAWINGS

A better understanding of the present invention will be had when reference is made to the accompanying drawings, wherein identical parts are identified by identical reference numerals and wherein:

FIG. 1 shows a top plan view of an embodiment of the composite reinforcement of the present invention.

DETAILED DESCRIPTION OF THE PRESENT INVENTION

In a typical reinforcement as known in the prior art, a fiberglass yarn having a yield in the range of 1800 to 7500 has been used. The use of fiberglass yarns heavier than 1800 yield is effectively unknown, probably due to difficulties in handling these yarns in the conventional machines. Because these materials are yarns, they comprise a plurality of individual strands having a length which is very large relative to a diameter thereof, in fact, the strands to which we refer are substantially monofilamentous. The individual strands are not staple strands, as a cotton or wool yarn might comprise, but there is a significant amount of physical processing necessary to form the strands into a stable and processible yarn structure, particularly one which exhibits tensional stability. These steps involve twisting, chemical finishing, etc. As a result of the processing necessary to manufacture it, a yarn will tend to be circular in cross-sectional area and exhibit a tendency to not want to lay flat. The individual strands are not easily detectable to the unaided eye, and the surface treatments of the strands results in a yarn which is observed to have a very "flat" or "matte" appearance.

More recent developments have made bundles of fiberglass rovings commercially available. A roving is a fiber which effectively has an effectively infinite length to diameter ratio. Unlike a fiberglass yarn, the bundle of fiberglass rovings have not been twisted and intertangled with the other individual rovings comprising the bundle, so the individual rovings are laid together in substantially parallel fashion, at which they may be held together by known binding techniques, although it is also known to sell roving bundles in which the individual rovings are just laid in parallel. When we refer to a roving bundle, we generally refer to a plurality of monofilamentous roving fibers in parallel configuration, although a single roving could constitute a bundle by itself. Common commercial sales practice is to sell rovings wound in creel packages, so that the individual rovings may be unwound from the package. Since they have not been twisted, roving bundles tend to lay flatter. Because they are not twisted together or intertangled, a rovings bundle may more easily assume a rectangular cross-sectional area, particularly when the individual rovings have not been bound together in any fashion and lie effectively in a side-by-side relationship. If one were to cut through a yarn and a roving bundle and to compare the portion of the cross-sectional area representing fiber to the portion of the non-fiber cross-sectional area (mostly air and empty space), one would find that the roving bundle has a higher ratio of fiber to non-fiber. Fiberglass rovings bundles in the 1200 and 1800 yield ranges and lower are commercially available, with the rovings bundles being less expensive when compared on an equivalent weight basis to a fiberglass yarn. When rovings bundles are formed into composites, either woven or non-woven, the resultant product is thinner and more flexible than an equivalent composite made of fiberglass yarn. The rovings bundle useful in the present invention will typically have individual fibers which are discernable to the unaided eye and the surface appearance will tend to be glossier or more reflective than the flat or matte surface of the fiberglass yarn. Fiberglass rovings of the type useful in the present invention are commercially available from companies such as PPG Industries of Pittsburgh, Pa., with 1200 and 1800 yield sizes being typical. On an equivalent weight basis, an 1800 yield roving is less expensive than yarn.

The composite substrate of the preferred embodiment of the present invention comprises at least one layer of a web comprising a mat, a veil or a fleece-like material to which fiberglass rovings bundles are attached. This web serves as a closed type carrier or support for receiving the bituminous material with which it will be impregnated. It is described as being a web because it will typically be wound on a roll prior to processing. This winding on the roll defines a longitudinal direction to the effectively rectangular planar web, which is also generally referred to as the "machine direction" when it is run through processing machines. It also defines a side to side or transverse direction, which is referred to as the cross machine direction, since it is perpendicular to the machine direction. The web also provides a locus of points for attaching the rovings bundles in a layered manner. In one embodiment, a first layer of the fiberglass rovings bundles are laid down on the web in a plane parallel to the plane of the web in a manner that a longitudinal axis of the individual rovings is parallel to the warp or machine direction of the web, defining a warp or machine direction layer. A second layer of rovings bundles is then laid down in a plane also parallel to the plane of the web, but with a longitudinal axis of the individual rovings perpendicular to the warp or machine direction of the web. This second layer may be referred to as the weft, cross machine or fill layer. The layers of roving bundles are not woven into each other, even though they are referred to in the same manner as woven warp and weft fibers would be. The first and second layers of rovings bundles which make up the planar layers are laid out in discrete, regularly spaced pattern. They are attached to the carrier web at a large plurality of points by adhesives, by lamination, or by mechanical attachment, such as through knitting or sewing machines. The longitudinal axes of the respective first and second layers, when viewed normal to the parallel planes they define, will be seen to intersect, either obliquely or perpendicularly, but they will not be parallel. Additional planar layers of rovings, and possibly even layers of obliquely angled fiberglass yarn, may be laid down in intersecting directions at various degrees of angularity to the warp or 0 degree layer and the weft or fill or 90 degree layer.

FIG. 1 shows a example of a stitched composite material 10 comprising the composite reinforcement of the present invention. Viewed from the top in a plan view, the particular composite comprises a bottom layer of a carrier web 12, shown as a woven mat, especially a mat woven from a polyester, although a variety of additional materials, including cellulose or the like, are available. Immediately atop the mat 12 is a series of cross machine fiberglass rovings bundles 14, which pass horizontally across the figure, the machine direction of the composite being in the vertical direction. Atop the cross machine bundles 14 are a series of machine direction bundles 16, also of fiberglass rovings. Each of the roving bundles 14, 16 are seen to represent a plurality of individual rovings in parallel arrangement. Note that the two layers of roving bundles are not woven into each other. Note also that the longitudinal axes of the individual rovings in the respective first and second bundles are positioned so that they are either oblique or perpendicular to each other, but they are not parallel. Securing the roving bundles 14, 16 to each other and to the mat 12 are a series of stitches 18, typically made by machine using a polyester yarn. While this embodiment 10 shows one particular configuration, it would certainly be possible to use other configurations, including placing the machine direction bundles 16 directly atop the mat 12 or placing the mat 12 between the bundles 14, 16. Similarly, adhesives may be used on the mat 12 or the bundles 14, 16 to hold the composite 10 together. Conventional adhesives which are useful in securing these rovings bundles to the scrim web will be known to those of skill in this art once the particulars of the scrim web itself are known.

A preferred construction of the composite 10 would include a layer of machine direction rovings bundles 16 at a count of 7 rovings per inch, the individual rovings being 1800 yield or heavier. Similarly, a preferred cross direction layer of roving bundles 14 would be at a count of 7 rovings per inch, the individual rovings being 1800 yield or heavier. In the preferred construction, the rovings bundles are laid down so that the individual rovings in each bundles are in a side-by-side effectively monolayer position, giving the bundle an substantially rectangular cross-sectional area. The preferred polyester mat would weigh in the range of from about 0.5 to 2.0 ounces per square yard. It is particularly preferred to use rovings having a 1000 yield or heavier and it is especially preferred to use rovings having a 600 yield or heavier. Two known rovings which are commercially useful for this application have yields of 415 and 675, respectively.

The process of manufacturing this composite material may be achieved online by bringing together the carrier web, cross-directed rovings bundles and stitching. One method of mechanical attachment is sewing with a Malimo or weft insertion machine with stitch-through capability, commonly referred to as a stitch bonding machine. In the process, a plurality of direct draw rovings will be drawn from packages and positioned in the machine and cross machine directions atop a polyester mat, which is simultaneously delivered to the stitch bonding machine. A polyester yarn, typically of about 100 denier, is stitched around the roving bundles 14, 16 and through the mat 12, resulting in composite 10.

Once the composite 10 is assembled, usually in a web, it may be fed through one or more vats in which it is saturated with bituminous materials, using well-known methods. The molten bitumen, in the temperature range of about 275° F. to about 450° F., may contain pre saturation or primer asphalts as well as modified bituminous compounds. Some of the modifications to the bitumen include the addition of about 20 weight % atactic polypropylene (APP), or styrene-butadiene-styrene (SBS) block copolymer, in the range of about 5 to about 22 weight %. Secondary modifiers also include styrene-ethylene-butylene-styrene (SEBS) block copolymer or styrene-isoprene-styrene (SIS) block copolymer. After assembly and prior to saturation in the bitumen, it is clearly preferred but not required that a coating of adhesive/binder be added to the composite. Such a coating could include poly(vinyl alcohol), SBS, acrylic binders and the like, to both stiffen the composite and to increase adhesion of the bituminous material.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A bituminous roofing composite merial comprising a first set of rovings bundles connected to a second set of rovings bundles, a carrier web connected to the first set of rovings bundles, and a bituminous material; said first set of rovings bundles positioned between said second set of rovings bundles and said carrier web, said first set of rovings bundles positioned non-parallel to said second set of rovings bundles, said carrier web including a cellulose material, said bituminous material at least partially impregnated in said carrier web.

2. The composite material as defined in claim 1, wherein said first set of rovings bundles includes a plurality of bundles spaced apart in a parallel relationship, said second set of rovings bundles includes a plurality of bundles spaced apart in a parallel relationship.

3. The composite material as defined in claim 1, wherein said first set of rovings bundles is positioned perpendicular to said second set of rovings bundles.

4. The composite material as defined in claim 2, wherein said first set of rovings bundles is positioned perpendicular to said second set of rovings bundles.

5. The composite material as defined in claim 1, wherein said first set of rovings bundles and said second set of rovings bundles include fiberglass.

6. The composite material as defined in claim 4, wherein said first set of rovings bundles and said second set of rovings bundles include fiberglass.

7. The composite material as defined in claim 1, wherein said carrier web is a cellulose material.

8. The composite material as defined in claim 6, wherein said carrier web is a cellulose material.

9. The composite material as defined in claim 1, wherein said first set of rovings bundles includes individual rovings of at least 1800 yield, said second set of rovings bundles includes individual rovings of at least 1800 yield.

10. The composite material as defined in claim 6, wherein said first set of rovings bundles includes individual rovings of at least 1800 yield, said second set of rovings bundles includes individual rovings of at least 1800 yield.

11. The composite material as defined in claim 8, wherein said first set of rovings bundles includes individual rovings of at least 1800 yield, said second set of rovings bundles includes individual rovings of at least 1800 yield.

12. The composite material as defined in claim 1, wherein said first set of rovings bundles is connected to said second set of rovings bundles by a connector that includes stitching.

13. The composite material as defined in claim 10, wherein said first set of rovings bundles is connected to said second set of rovings bundles by a connector that includes stitching.

14. The composite material as defined in claim 11, wherein said first set of rovings bundles is connected to said second set of rovings bundles by a connector that includes stitching.

15. The composite material as defined in claim 1, wherein said carrier web is connected to said first set of rovings bundles by a connector that includes stitching.

16. The composite material as defined in claim 13, wherein said carrier web is connected to said first set of rovings bundles by a connector that includes stitching.

17. The composite material as defined in claim 14, wherein said carrier web is connected to said first set of rovings bundles by a connector that includes stitching.

18. The composite material as defined in claim 1, including an adhesive coating on said first set of rovings bundles, said second set of rovings bundles, and said carrier web.

19. The composite material as defined in claim 16, including an adhesive coating on said first set of rovings bundles, said second set of rovings bundles, and said carrier web.

20. The composite material as defined in claim 17, including an adhesive coating on said first set of rovings bundles, said second set of rovings bundles, and said carrier web.

21. The composite material as defined in claim 1, wherein said bituminous material includes atactic polypropylene or styrene-butadiene-styrene block copolymer.

22. The composite material as defined in claim 19, wherein said bituminous material includes atactic polypropylene or styrene-butadiene-styrene block copolymer.

23. The composite material as defined in claim 20, wherein said bituminous material includes atactic polypropylene or styrene-butadiene-styrene block copolymer.

24. The composite material as defined in claim 21, wherein said bituminous material includes styrene-ethylene-butylene-styrene block copolymer or styrene-isoprene-styrene block copolymer.

25. The composite material as defined in claim 22, wherein said bituminous material includes styrene-ethylene-butylene-styrene block copolymer or styrene-isoprene-styrene block copolymer.

26. The composite material as defined in claim 23, wherein said bituminous material includes styrene-ethylene-butylene-styrene block copolymer or styrene-isoprene-styrene block copolymer.

27. The composite material as defined in claim 1, wherein said carrier web is a woven material.

28. The composite material as defined in claim 25, wherein said carrier web is a woven material.

29. The composite material as defined in claim 26, wherein said carrier web is a woven material.

* * * * *

UNITED STATES PATENT AND TRADEMARK OFFICE
CERTIFICATE OF CORRECTION

PATENT NO. : 6,524,980 B1 Page 1 of 1
APPLICATION NO. : 09/410518
DATED : February 25, 2003
INVENTOR(S) : Fred Fensel et al.

It is certified that error appears in the above-identified patent and that said Letters Patent is hereby corrected as shown below:

Column 6, Claim 1 - "merial" should be corrected to read "material".

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,524,980 B1 | Page 1 of 1 |
| APPLICATION NO. | : 09/410518 | |
| DATED | : February 25, 2003 | |
| INVENTOR(S) | : Fred Fensel et al. | |

It is certified that error appears in the above-identified patent and that said Letters Patent is hereby corrected as shown below:

Column 6, Claim 1, line 2, - "merial" should be corrected to read "material".

This certificate supersedes the Certificate of Correction issued March 16, 2010.

Signed and Sealed this

Fourth Day of May, 2010

David J. Kappos
*Director of the United States Patent and Trademark Office*